A. Z. NEFF.
Horse Blanket Adjuster.
No. 124,506.
Patented March 12, 1872.
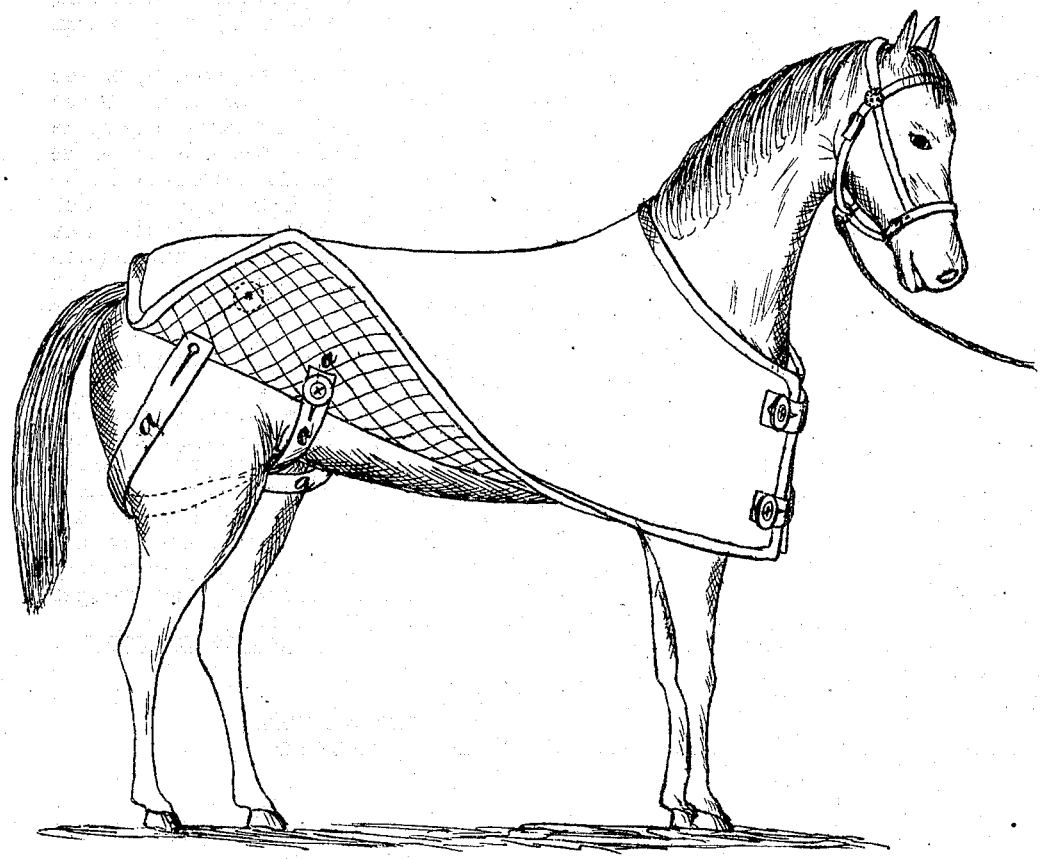
Witnesses.
W. Davidson Jones,
Charles P. Winegan.
Inventor.
Andrew Z. Neff.

124,506

UNITED STATES PATENT OFFICE.

ANDREW Z. NEFF, OF AMSTERDAM, NEW YORK.

IMPROVEMENT IN HORSE-BLANKET ADJUSTERS.

Specification forming part of Letters Patent No. 124,506, dated March 12, 1872.

SPECIFICATION.

*To all whom it may concern:*

Be it known that I, ANDREW Z. NEFF, of Amsterdam, Montgomery county, in the State of New York, have invented a new and Improved Mode for Constructing and Applying "Blanket-Adjusters for Horse-Blankets;" and I do hereby declare that the following is a clear and exact description of the said invention.

The nature of my invention consists in providing a strip of leather, list, braid, or webbing of any suitable material of sufficient strength and length to be applied by one end thereof by means of a button, buckle, or otherwise to the under side of a horse-blanket, at a point thereon (when the blanket is in position on the horse) just above and in front of the stifle-joint of the horse, and passing thence downward under the horse's flank between the hind legs of the horse; and thence upward the hind leg, and is buckled, or in any other manner fastened, on the outside of the rear end of the blanket, so that when in position as described, and as substantially exhibited in the accompanying photographic drawing (which is a part of this specification) by letter *a a a*, the blanket will be held in position over the horse's rump. Two of the aforesaid described strips or straps are provided and applied, as described, one around each hind leg of the horse, in the manner substantially as set forth. Having placed these blanket-adjusters around each hind leg of the horse, the front ends of the blanket are fastened, with a strap or button, together in front of the breast of the horse.

This mode of constructing blanket-adjusters for a horse-blanket dispenses with the use of the usual objectionable girth around the horse, also dispenses with the use of a crupper; which is now generally in use.

My mode of adjusting and holding on the blanket will securely fasten the blanket to the horse's back, and prevent a possibility of its turning or being pulled off when the horse lies down; and another useful feature is in the doing away with the use of the crupper, which ofttimes makes the horse uneasy, or produces a soreness about his tail. My blanket-adjuster permits also the blanket to rest in a fixed position upon the horse with ease and comfort to the animal.

What I claim as my invention, and desire to secure by Letters Patent, is—

The application of blanket-adjusters for horse-blankets, by passing them between and around the hind legs of a horse, and fastened at one end on the under side of a horse-blanket, and at the other end on the outside of the blanket, as hereinbefore substantially described and set forth, thus entirely dispensing with a girth around the body and crupper around the tail of the horse.

ANDREW Z. NEFF.

Witnesses:
   W. DAVIDSON JONES,
   CHAS. P. WINEGAR.